(12) United States Patent
Malik (10) Patent No.: US 7,844,678 B2
(45) Date of Patent: *Nov. 30, 2010

(54) FILTERING EMAIL MESSAGES CORRESPONDING TO UNDESIRABLE DOMAINS

(75) Inventor: Dale W. Malik, Dunwoody, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 227 days.

This patent is subject to a terminal disclaimer.

(21) Appl. No.: 12/146,155

(22) Filed: Jun. 25, 2008

(65) Prior Publication Data

US 2008/0256210 A1 Oct. 16, 2008

Related U.S. Application Data

(63) Continuation of application No. 11/466,948, filed on Aug. 24, 2006, now Pat. No. 7,506,031, which is a continuation of application No. 10/610,736, filed on Jun. 30, 2003, now Pat. No. 7,155,484.

(51) Int. Cl.
*G06F 13/00* (2006.01)
(52) U.S. Cl. .................. 709/206; 709/219; 709/224
(58) Field of Classification Search .......... 709/206, 709/217, 219, 223, 224, 225
See application file for complete search history.

(56) References Cited

U.S. PATENT DOCUMENTS

| | | | |
|---|---|---|---|
| 5,944,787 A | 8/1999 | Zoken | |
| 5,999,932 A | 12/1999 | Paul | |
| 6,023,723 A | 2/2000 | McCormick | |
| 6,052,709 A | 4/2000 | Paul | |
| 6,161,130 A | 12/2000 | Horvitz | |
| 6,192,360 B1 | 2/2001 | Dumais | |
| 6,249,805 B1 | 6/2001 | Fleming | |
| 6,266,692 B1 | 7/2001 | Greenstein | |
| 6,321,267 B1 | 11/2001 | Donaldson | |
| 6,442,588 B1 | 8/2002 | Clark | |
| 6,480,885 B1 | 11/2002 | Olivier | |
| 6,654,787 B1 | 11/2003 | Aronson | |
| 6,654,800 B1 | 11/2003 | Rieger | |
| 6,665,715 B1 * | 12/2003 | Houri | .......... 709/223 |
| 6,708,205 B2 | 3/2004 | Sheldon | |

(Continued)

OTHER PUBLICATIONS

Daniell; Non-Final Rejection mailed Feb. 5, 2007 for U.S. Appl. No. 10/686,293 filed Oct. 14, 2003.

(Continued)

*Primary Examiner*—Viet Vu
(74) *Attorney, Agent, or Firm*—Thomas, Kayden, Horstemeyer & Risley, LLP (57) ABSTRACT

An email message is filtered to determine whether or not it is an undesired email message (e.g., "spam," "junk mail," etc.) that originates from an undesirable domain, such as, for example, a domain designated as originating from an undesirable geographic location. In some embodiments, upon determining that the email message originates from an undesirable domain, the email message is deleted (e.g., permanently removed, moved to a designated folder, marked for followup, etc.). In other embodiments, upon determining that the email message originates from an undesirable domain, the email message is further filtered to determine whether or not the email message includes attributes that indicate that the email message should not be discarded.

16 Claims, 5 Drawing Sheets

U.S. PATENT DOCUMENTS

| | | | |
|---|---|---|---|
| 6,732,157 B1 | 5/2004 | Gordon | |
| 6,748,403 B1 | 6/2004 | Lemke | |
| 6,757,740 B1 | 6/2004 | Parekh | |
| 6,769,016 B2 | 7/2004 | Rothwell | |
| 6,779,021 B1 | 8/2004 | Bates | |
| 6,782,510 B1 | 8/2004 | Gross | |
| 6,842,773 B1 | 1/2005 | Ralston | |
| 6,854,014 B1 | 2/2005 | Amin | |
| 6,968,571 B2 | 11/2005 | Devine | |
| 7,051,077 B2 | 5/2006 | Lin | |
| 7,117,358 B2* | 10/2006 | Bandini et al. | 713/153 |
| 7,155,484 B2 | 12/2006 | Malik | |
| 7,155,608 B1 | 12/2006 | Malik | |
| 7,320,020 B2 | 1/2008 | Chadwick et al. | |
| 7,451,184 B2 | 11/2008 | Malik et al. | |
| 2001/0054101 A1 | 12/2001 | Wilson | |
| 2002/0013692 A1 | 1/2002 | Chandhok | |
| 2002/0049806 A1 | 4/2002 | Gatz | |
| 2002/0059454 A1 | 5/2002 | Barrett | |
| 2002/0065828 A1 | 5/2002 | Goodspeed | |
| 2002/0073233 A1 | 6/2002 | Gross | |
| 2002/0107712 A1 | 8/2002 | Lam | |
| 2002/0116641 A1 | 8/2002 | Mastrianni | |
| 2002/0199095 A1 | 12/2002 | Bandini | |
| 2003/0144842 A1 | 7/2003 | Addison | |
| 2003/0172020 A1 | 9/2003 | Davies | |
| 2003/0172196 A1 | 9/2003 | Hejlsberg | |
| 2003/0233418 A1 | 12/2003 | Goldman | |
| 2004/0015554 A1 | 1/2004 | Wilson | |
| 2004/0039786 A1 | 2/2004 | Horvitz | |
| 2004/0054733 A1 | 3/2004 | Weeks | |
| 2004/0054741 A1 | 3/2004 | Weatherby | |
| 2004/0064537 A1 | 4/2004 | Anderson | |
| 2004/0073617 A1 | 4/2004 | Milliken | |
| 2004/0088359 A1 | 5/2004 | Simpson | |
| 2004/0093384 A1 | 5/2004 | Shipp | |
| 2004/0117451 A1 | 6/2004 | Chung | |
| 2004/0167964 A1 | 8/2004 | Rounthwaite | |
| 2004/0181581 A1 | 9/2004 | Kosco | |
| 2005/0022008 A1 | 1/2005 | Goodman | |
| 2005/0050150 A1 | 3/2005 | Dinkin | |
| 2006/0047769 A1 | 3/2006 | Davis et al. | |

OTHER PUBLICATIONS

Daniell; Non-Final Rejection mailed Dec. 5, 2007 for U.S. Appl. No. 10/686,293 filed Oct. 14, 2003.
Malik; Advisory Action mailed Dec. 19, 2007; U.S. Appl. No. 10/687,439 filed Oct. 14, 2003.
Malik; Final Rejection mailed Oct. 4, 2007 for U.S. Appl. No. 10/687,439 filed Oct. 14, 2003.
Malik; Final Rejection mailed Oct. 4, 2007 for U.S. Appl. No. 10/687,439 filed Oct. 14, 2003.
Malik; Non-Final Rejection mailed Mar. 17, 2008 for U.S. Appl. No. 10/687,439 filed Oct. 14, 2003.
Malik; Non-Final Rejection mailed May 18, 2007 for U.S. Appl. No. 10/687,439 filed Oct. 14, 2003.
Daniell; Final Rejection mailed Dec. 12, 2007 for U.S. Appl. No. 10/686,346 filed Oct. 14, 2003.
Daniell; Non-Final Rejection mailed Mar. 22, 2007 for U.S. Appl. No. 10/686,346 filed Oct. 14, 2003.
Daniell; Non-Final Rejection mailed Jul. 18, 2008 for U.S. Appl. No. 10/686,346 filed Oct. 14, 2003.
Daniell; Pre-Brief Appeal Conference decision mailed Apr. 8, 2008 for U.S. Appl. No. 10/686,346 filed Oct. 14, 2003.
Daniell; Final Rejection mailed Jul. 21, 2008 for U.S. Appl. No. 10/686,558 filed Oct. 14, 2003.
Daniell; Final Rejection mailed Jul. 21, 2008 for U.S. Appl. No. 10/686,558 filed Oct. 14, 2003.
Daniell; Non-Final Rejection mailed Jan. 2, 2008 for U.S. Appl. No. 10/685,558 filed Oct. 14, 2003.
Malik; Final Rejection mailed Nov. 15, 2005 for U.S. Appl. No. 10/005,641 filed Dec. 5, 2001.
Malik; Non-Final Rejection mailed May 5, 2006 for U.S. Appl. No. 10/005,641 filed Dec. 5, 2001.
Malik; Non-Final Rejection mailed May 16, 2005 for U.S. Appl. No. 10/005,641 filed Dec. 5, 2001.
Malik; Notice of Allowance and Fees Due mailed Oct. 17, 2006 for U.S. Appl. No. 10/005,641 filed Dec. 5, 2001.
Brain; "The Simplicity of E-mail", How E-mail Works, Marshall Brian's How Stuff Works; copyright 1998-2001; 1 page.
Brain; "Understanding a Simple E-mail Server?", How E-mail Works, Marshall Brian's How Stuff Works; copyright 1998-2001; 2 pages.
Brain; "Understanding Attachments?", How E-mail Works, Marshall Brian's How Stuff Works; copyright 1998-2001; 2 pages.
Brain; "Understanding E-mail Clients?", How E-Mail Works, Marshall Brian's How Stuff Works; copyright 1998-2001; 2 pages.
Brain; "Understanding SMTP?",How E-mail Works, Marshall Brian's How Stuff Works; copyright 1998-2001; 1 page.
Brain; "Understanding the POP3 Server?", How E-mail Works, Marshall Brian's How Stuff Works; copyright 1998-2001; 2 pages.
Brain; "Understanding the Real E-mail System?", How E-mail Works, Marshall Brian's How Stuff Works; copyright 1998-2001; 3 pages.
Brain; "What is an E-mail Message?", How E-Mail Works, Marshall Brian's How Stuff Works; copyright 1998-2001; 2 pages.
Coleman; "How Does Email Work?", Yale University Library Workstation Support Group; Mar. 18, 1997; 4 pages.
Graham; "A Plan for Spam"; www.paulgraham.com/spam.html; printed Jun. 26, 2003; pp. 1-13.
Graham; "Better Bayesian Filtering"; www.paulgraham.com/better.html; printed Jun. 26, 2003; pp. 1-11.
Houten-Kemp; "E-Mail Glossary", Everything E-mail, Internet Mail Services Netowrk, Inc ., Ipswich, MA; copyright 1997-1999; 3 pages.
IATS Computing Knowledge Base; "How does Email Work?", University of Missouri, Columbia; Aug. 16, 2000; 4 pages.
Levine; "Spammers do more than spam", Promote Responsible Net Commerce: Help Stamp out Spam!; 2 pages.
Levine; "Why is Spam bad?", Promote Responsible Net Commerce: Help Stamp out Spam!; 2 pages.
Mueller; "What is Spam?", Promote Responsible Net Commerce: Help Stamp out Spam; 1 page.
Oracle; "How Does eMail Server Work?", Oracle eMail Server Understanding and Planning Guide, Release 5.1, copyright 2000; 13 pages.
Rivest; "The MD5 Message-Digest Algorithm", Internet RFC 1321; Apr. 1992; 21 pages.
Shami; "A Bayesian Approach to Filtering Junk E-Mail", 8 pages.
Spamxpress; "spamxpress—anti-spam Rules/Filters for Outlook Express", Jun. 2, 2003, Web page retreived from The Internet Archive Wayback Machine, available at: http://web.archive.org/web/20030602073212/http://www.spamxpress.com/; 3 pages.
Uuencode and MIME FAQ. From website: http://web.archive.org/web/20021217052047/http://userrs.rcn.com/wussery/attach.html. pp. 1 and 2; printed Oct. 19, 2007.
Williams; "Effective Spam Filtering with Eudora—The Filters", Aug. 6, 2003, Web page retreived from The Internet Archive Wayback Machine, available at http://web.archive.org/web/20030806181316/http://www.cecilw.com/eudora/filters.htm; 3 pages
Malik; U.S. Appl. No. 11/466,948 filed Jun. 30, 2003.
Malik; U.S. Appl. No. 11/466,948 filed Aug. 24, 2006.
Daniell; U.S. Appl. No. 10/685,656 filed Oct. 14, 2003.
Daniell; U.S. Appl. No. 10/686,293 filed Oct. 14, 2003.
Malik; U.S. Appl. No. 10/687,439 filed Oct. 14, 2003.
Daniell; U.S. Appl. No. 10/686,346 filed Oct. 14, 2003.
Malik; U.S. Appl. No. 10/685,558 filed Oct. 14, 2003.
Malik; U.S. Appl. No. 10/005,641 filed Dec. 5, 2001.
Malik; U.S. Appl. No. 11/609,164 filed Dec. 11, 2006.
Daniell; U.S. Appl. No. 11/245,888 filed Oct. 7, 2005.
Malik; Examiner Interview Summary Record mailed Jun. 1, 2006 for U.S. Appl. No. 10/610,736 filed Jun. 30, 2003.

Malik; Examiner Interview Summary Record mailed Jul. 6, 2006 for U.S. Appl. No. 10/610,736 filed Jun. 30, 2003.

Malik; Examiner Interview Summary Record mailed Dec. 21, 2004 for U.S. Appl. No. 10/610,736 filed Jun. 30, 2003.

Malik; Final Rejection mailed Apr. 11, 2006 for U.S. Appl. No. 10/610,736 filed Jun. 30, 2003.

Malik; Final Rejection mailed May 25, 2005 for U.S. Appl. No. 10/610,736 filed Jun. 30, 2003.

Malik; Non-Final Rejection mailed Nov. 12, 2004 for U.S. Appl. No. 10/610,736 filed Jun. 30, 2003.

Malik; Non-Final Rejection mailed Nov. 25, 2005 for U.S. Appl. No. 10/610,736 filed Jun. 30, 2003.

Malik; Non-Final Rejection mailed Nov. 30, 2005 for U.S. Appl. No. 10/610,736 filed Jun. 30, 2003.

Malik; Notice of Allowance and Fees Due mailed Jul. 6, 2006 for U.S. Appl. No. 10/610,736 filed Jun. 30, 2003.

Malik; Final Rejection mailed Sep. 26, 2007 for U.S. Appl. No. 11/466,948 filed Aug. 24, 2006.

Malik; Non-Final Rejection mailed Mar. 9, 2007 for U.S. Appl. No. 11/466,948 filed Aug. 24, 2006.

Malik; Notice of Allowance and Fees Due mailed Mar. 27, 2008 for U.S. Appl. No. 11/466,948 filed Aug. 24, 2006.

Daniell; Examiner Interview Summary Record mailed Dec. 21, 2007 for U.S. Appl. No. 10/685,656 filed Oct. 14, 2003.

Daniell; Final Rejection mailed Mar. 31, 2008 for U.S. Appl. No. 10/685,656 filed Oct. 14, 2003.

Daniell; Non-Final Rejection mailed Oct. 30, 2007 for U.S. Appl. No. 10/685,656 filed Oct. 14, 2003.

Daniell; Examiner Interview Summary Record mailed Apr. 7, 2008 for U.S. Appl. No. 10/686,293 filed Oct. 14, 2003.

Daniell; Final Rejection mailed May 22, 2008 for U.S. Appl. No. 10/686,293 filed Oct. 14, 2003.

Daniell; Final Rejection mailed Jul. 23, 2007 for U.S. Appl. No. 10/686,293 filed Oct. 14, 2003.

Daniell; Non-Final Office Action mailed Jul. 20, 2010 for U.S. Appl. No. 10/685,656 filed Oct. 14, 2003.

Files, J. and Huskey, H. An information retrieval system based on superimposed coding. AFIPS Joint Computer Conferences. Proceedings of the Nov. 18-20, 1969, fall joint computer conference. 1969. pp. 423-431.

Sheppard; Non-Final Office Action mailed Jul. 7, 2010 for U.S. Appl. No. 11/245,888 filed Oct. 7, 2005.

Woitaszek; Identifying Junk Electronic Mail in Microsoft Outlook with a Support Vector Machine. Proccedings of the 2003 Symposium on Applications of the Internet, held Jan. 27-31, 2003; 4 pages.

Daniell; Non-Final Rejection mailed Aug. 21, 2008 for U.S. Appl. No. 10/685,656 filed Oct. 14, 2003.

Malik; Notice of Allowance and Fees Due mailed Sep. 5, 2008 for U.S. Appl. No. 10/687,439 filed Oct. 14, 2003.

Daniell; Non-Final Rejection mailed Oct. 15, 2008 for U.S. Appl. No. 10/686,293 filed Oct. 14, 2003.

* cited by examiner

```
Microsoft Mail Internet Headers Version 2.0
Received: from zzzz.ZZZ.com ([ZZZ.ZZZ.36.126]) by yyyy.com with Microsoft
SMTPSVC(5.0.2195.3779);
       Tue, 20 May 2003 15:06:03 -0400
Received: from mail1.ZZZ.com (mail1.ZZZ.com [ZZZ.ZZZ.36.102])
       by zzzz.ZZZ.com (8.12.9/8.12.9) with ESMTP id h4KJDwja090435
       for <joeface@zzzz.ZZZ.com>; Tue, 20 May 2003 15:13:58 -0400 (EDT)
Received: from mcafee.ZZZ.com (mcafee.ZZZ.com [ZZZ.ZZZ.36.86])
       by mail1.ZZZ.com (8.12.9/8.12.9) with SMTP id h4KJDwEU009077
       for <joeface@zzzz.ZZZ.com>; Tue, 20 May 2003 15:13:58 -0400
Received: from smtp.ZZZ.com(ZZZ.ZZZ.36.186) by mcafee.ZZZ.com via csmap
       id 29581; Tue, 20 May 2003 15:14:12 -0400 (EDT)
Received: from utility3.ZZZ.com (utility3.ZZZ.com [ZZZ.ZZZ.36.202])
       by smtp.ZZZ.com (8.12.9/8.12.9) with ESMTP id h4KJDjjZ026734
       for <joeface@zzzz.ZZZ.com>; Tue, 20 May 2003 15:13:45 -0400
Received: from staff ([211.209.246.93])  ← 250
       by utility3.ZZZ.com (8.12.9/8.12.9) with SMTP id h4KJDc6h013065
       for <joeface@zzzz.ZZZ.com>; Tue, 20 May 2003 15:13:43 -0400
Message-Id: <200305201913.h4KJDc6h013065@utility3.ZZZ.com>
Reply-To: test3@test3.com
From: soonil<basic4@basic4.com>
To: joeface@zzzz.ZZZ.com
Subject:
Date: Wed, 21 May 2003 04:12:39 +0900
Mime-Version: 1.0
Content-Type: text/html; charset="euc-kr"
X-Perlmx-Spam: Gauge=XXXXXXIIIIIII, Probability=68%,
Report="CHARSET_FARAWAY, CTYPE_JUST_HTML,
FORGOTTEN_PASSWORD, NO_REAL_NAME, OFFER, RCVD_IN_RFCI,
SPAM_PHRASE_05_08, SUBJ_MISSING, __CTYPE_IS_HTML,
__EVITE_CTYPE, __SUBJ_MISSING"
Content-Transfer-Encoding: base64
X-MIME-Autoconverted: from 8bit to base64 by zzzz.ZZZ.com id h4KJDwja090435
Return-Path: basic4@basic4.com
X-OriginalArrivalTime: 20 May 2003 19:06:58.0421 (UTC)
FILETIME=[FC903250:01C31F02]
```

FIG. 2B

FILTERING EMAIL MESSAGES CORRESPONDING TO UNDESIRABLE DOMAINS

CROSS-REFERENCE TO RELATED APPLICATIONS

This application is a continuation of application Ser. No. 11/466,948, filed Aug. 24, 2006, which is a continuation of application Ser. No. 10/610,736, filed on Jun. 30, 2003, each of which is entirely incorporated herein by reference.

FIELD OF THE INVENTION

The present disclosure relates generally to digital communication and, more particularly, to email.

BACKGROUND

With the advent of the Internet, email has become prevalent in digital communications. For example, email messages are exchanged on a daily basis to conduct business, to maintain personal contacts, to send and receive files, etc. Unfortunately, undesired email messages have also become prevalent with increased email traffic. Often, these email messages are unsolicited advertisements, which are often referred to as "junk mail" or "spam." Currently, software applications exist, which remove some of the spam or junk mail from a recipient's email account, thereby reducing clutter in the recipient's email account. Some of these applications remove email messages that contain a particular text or content (e.g., large image files, etc.) that may indicate that the email message is spam or junk mail. Email messages that are determined to be spam or junk mail are then either removed (e.g., permanently deleted) or stored in a designated folder (e.g., "trash" folder, "junk mail" folder, etc.). Unfortunately, some of the algorithms used to detect spam or junk mail may be quite complicated and cumbersome. Due to the complexity of current anti-spam or anti-junk-mail algorithms, a need exists in the industry for simpler solutions.

SUMMARY

The present disclosure provides for filtering email messages originating from undesirable domains, such as, for example, addresses associated with designated geographical areas.

In this regard, one embodiment comprises receiving an email message having an originating IP address, extracting the originating IP address from the email message, and comparing the originating IP address to a list of undesirable IP addresses. The comparison results in a determination of whether or not the extracted email address is included in the list of undesirable IP addresses.

Systems, methods, features, and advantages will be or become apparent to one with skill in the art upon examination of the following drawings and detailed description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2B is a diagram showing an embodiment of an email header having an undesirable originating Internet protocol (IP) address and other email attributes.

DETAILED DESCRIPTION OF THE PREFERRED EMBODIMENTS

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Increasing email traffic brings a corresponding increase in junk mail or spam. It has now been discovered that much of the spam or junk mail originates from certain geographic areas, such as, for example, non-U.S. regions. Hence, by filtering email messages for any indicators that suggest an undesired geographic origin, much of the spam or junk mail can be filtered without the need for cumbersome algorithms that employ complex heuristics. The disclosed embodiments of the invention provide systems and methods for filtering email messages for indications that an email message may have originated from a domain located in an undesired geographic location. Since a great number of undesired geographic locations originate in non-U.S. regions, the term "non-U.S." is used throughout this disclosure as shorthand for undesired geographic locations that originate in non-U.S. regions. In the event that the email message is determined to originate from a domain from an undesired geographic location, the email message may be deleted, moved to a designated folder, further examined for other email attributes, etc.

Figure 1A:
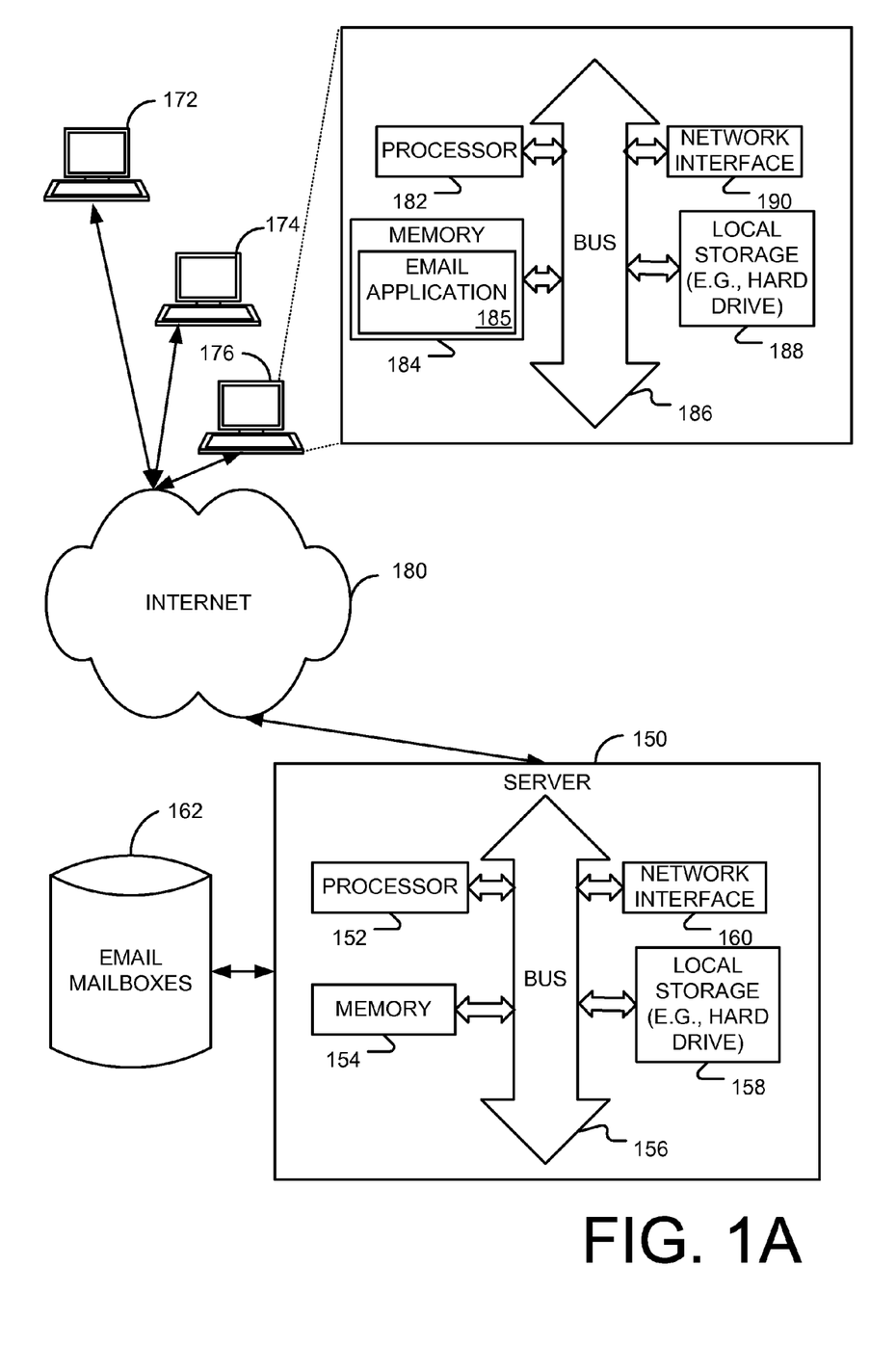
FIG. 1A is a block diagram showing an embodiment of an email environment.

FIG. 1A is a block diagram showing an embodiment of an email environment. As shown in FIG. 1A, some embodiments of an email system comprise workstations 172, 174, 176 that are coupled to a server 150 over a network such as the Internet 180. The server 150 is coupled to a database 162 that stores the email accounts (or mailboxes) of various users.

In the operating environment shown in FIG. 1A, a sender of an email message generates the email message at a sender workstation 172 and sends the email message through a network 180 to a recipient at a recipient workstation 176. As shown in FIG. 1A, the recipient workstation 176 includes a processor 182, a network interface 190, a memory 184, a local storage device 188, and a bus 186 that permits communication between the various components. While not explicitly shown, it should be appreciated that the other workstations 172, 174 may also include similar components that facilitate computation or execution of applications on the workstations 172, 174. In some embodiments, the local storage device 188 may be a hard drive configured to electronically store data. The local storage device 188 may also store computer programs that execute on the recipient workstation 176. In this sense, the processor 182 is configured to access any program that is stored on the local storage device 188, and execute the program with the assistance of the memory 184. In the embodiment of FIG. 1A, an email application 185 is shown as being loaded into memory 184 for launching at the workstation 176, thereby permitting the workstations 176 to send and receive email messages through the network 180. Since the functioning of computing devices is well known in the art, further discussion of the processor 182, the memory 184, and the local storage device 188 are omitted here. However, it should be appreciated that the memory 184 may be either volatile or non-volatile memory, or a combination thereof.

The network interface 190 is configured to provide an interface between the recipient workstation 176 and the network. Thus, the network interface 190 provides the interface for the workstation 176 to receive any data that may be entering from the network and, also, to transmit any data from the workstation 176 to the network. Specifically, in some embodiments, the network interface 190 is configured to permit communication between each of the workstations 172, 174, 176 and the server 150 and, additionally, to permit communication between the workstations 172, 174, 176 themselves. In this regard, the network interface 190 may be a modem, a network card, or any other interface that interfaces each of the workstations 172, 174, 176 to the network. Since various network interfaces are known in the art, further discussion of these components is omitted here. It should be understood that various aspects of the email application 185 may be conventional or may be custom tailored to specific needs.

Similar to the workstation 176, the server 150 may also include a processor 152, a memory 154, a network interface 160, and a local hard drive 158, which are in communication with each other over a local bus 156. Since the components 152, 154, 156, 158, 160 at the server 150 perform largely similar functions as the components 182, 184, 186, 188, 190 at the workstation 176, further discussion of the server-side components is omitted here.

Figure 1B:
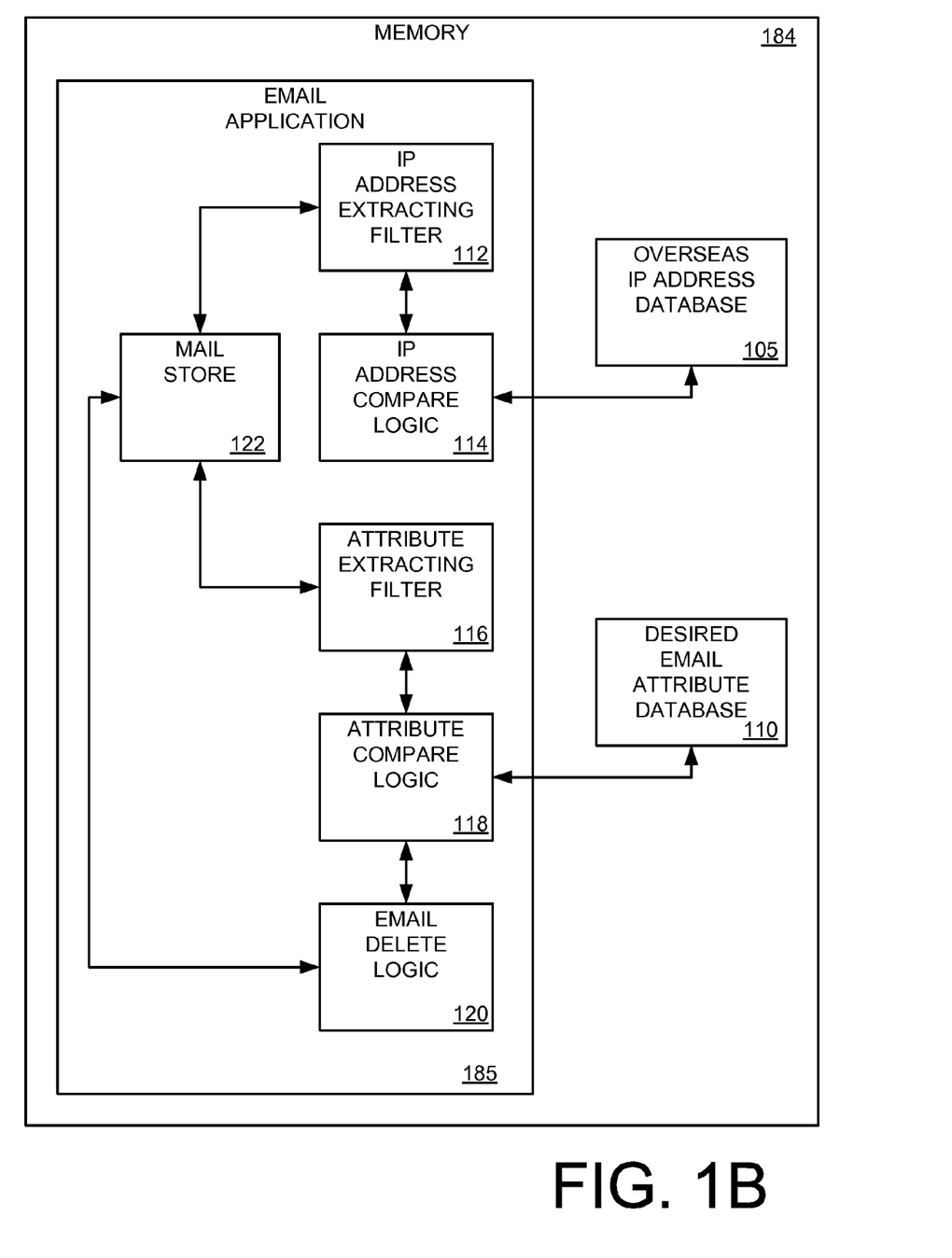
FIG. 1B is a block diagram showing an embodiment of an email application that filters email messages.

FIG. 1B is a block diagram showing an embodiment of an email application 185 that filters email messages to determine if the email messages originate from a domain located in an undesired geographic location. As shown in FIG. 1B, the email application 185 is stored in memory 184 along with a non-U.S. IP address database 105 and a desired email attribute database 110. The non-U.S. IP address database 105 includes a list of IP addresses that correspond to domains located in undesired geographic locations. For example, if the IP address 211.209.246.93 originates from a domain in Korea, then the non-U.S. IP address database 105 would list 211.209.246.93 as one of the non-U.S. IP addresses. Similarly, other known non-U.S. IP addresses (or ranges or other acceptable representations) are included in the non-U.S. IP address database 105.

The desired email attribute database 110 may include a list of desired email attributes. For example, the list of desired email attributes may include a particular sender's name, a specific email address of a sender, a specified sender IP address, email content, type of content (e.g., image file, executable file, document, etc.). In other words, the desired email attribute database 110 may include any detectable attribute or parameter included in an email message. Since email attributes are known in the art, further discussion of these attributes is omitted here.

The email application 185 comprises a mail store 122, an IP address extracting filter 112, IP address compare logic 114, an attribute extracting filter 116, attribute compare logic 118, and email delete logic 120. The mail store 122 stores email messages that are accessible by a recipient at the workstation 176. In this regard, the mail store 122 locally stores all incoming email messages and previously-read email messages so that the recipient can readily access the email messages from the workstation 176. Since the retrieval of email messages to the client from a mail server are known in the art, the process of retrieving email message for storage at the mail store 122 is not discussed herein.

In operation, for some embodiments, when email messages have been retrieved from the email server and stored at the mail store 122, the IP address extracting filter 112 filters the email messages to extract the IP address from which the email message originates. In other words, the IP address extraction filter 112 extracts the originating IP addresses from each of the email messages. In some embodiments, this information is extracted from the header of the email message. In other embodiments, the entire email message is examined to determine the originating IP address. In some embodiments, the contents of an email message may be indicative of origin from an undesired geographic region by, for example, foreign fonts or special characters embedded in the contents of the email message. In other embodiments, an embedded hyperlink in the body of the message may be indicative of origin from an undesired geographic region.

Thus, if an email address (e.g., BobJones@playpen.de) that is associated with a foreign country is included in the body, the header, or the return address of an email message, then this information may be used to discern the foreign origin of the email message. Similarly, if a website (e.g., funstuff.playpen.uk) that is associated with a foreign country is referenced in a hyperlink that is present in an email message, then that information may also be used to discern the non-U.S. origin of the email message. Additionally, other universal resource locators (URLs) and email addresses also found in non-U.S.-originating email messages may be stored in a database for future reference. Hence, if an email message originating from BobJones@playpen.de, which is a non-U.S. email address, also includes a web address in the body of the email message, such as freewebhosting.com, then that web address may also be categorized as non-U.S.-originating, regardless of whether or not freewebhosting.com is a non-U.S.-originating website.

In any event, each originating IP address is conveyed to the IP address compare logic 114, which compares the originating IP address to the non-U.S. IP addresses that are stored in the non-U.S. IP address database 105. In some embodiments, IP addresses are correlated to a domain located in various geographic locations by accessing a domain name server (DNS) that stores such information. Once an initial set of IP addresses are correlated to domains and stored in the non-U.S. IP address database 105, the database may be updated from time to time with additional IP addresses that are provided by the user. Alternatively, the additional IP addresses may be provided by the filter itself if the filter is an adaptive filter. In some embodiments, the IP address compare logic 114 may perform a string comparison between the originating IP address and each of the undesirable IP addresses in the database 105. The comparison results in a determination of whether or not the originating IP address is included in the non-U.S. IP address database 105.

The attribute extracting filter 116 extracts other known attributes from each of the email messages. The extracted attributes are conveyed to the attribute compare logic 118, which compares the extracted attributes with each of the desired email attributes in the desired email attribute database 110. The attribute compare logic 118 may perform a string comparison between the extracted attributes and the desired email attributes in the database 110. The comparison results in a determination of whether or not the email message includes any desired attributes. Hence, the attribute extracting filter 116, the attribute compare logic 118, and the desired email attribute database 110 work together to determine whether or not an email message in the mail store 122 is a desired email message, rather than spam or junk mail.

If the IP address compare logic 114 determines that the originating IP address of a particular email message is from a domain from an undesired geographic location and, additionally, if the attribute compare logic 118 determines that none of the extracted attributes of the email message are included in the desired email attribute database 110, then the particular email message is conveyed to the email delete logic 120, which deletes the email message. The email message may be deleted by permanently removing the email message from the mail store 122, moving the email message to a designated folder (e.g., trash folder), marking the email message for followup, etc. In other words, if the IP address compare logic 114 and the attribute compare logic 118 together determine that an email message in the mail store 122 is junk mail or spam that originates from a non-U.S. (or otherwise undesirable) domain, then the email delete logic 120 deletes the email message (e.g., permanently removes the email message, moves the email message to a designated folder, marks the email message for followup, etc.).

Figure 2A:
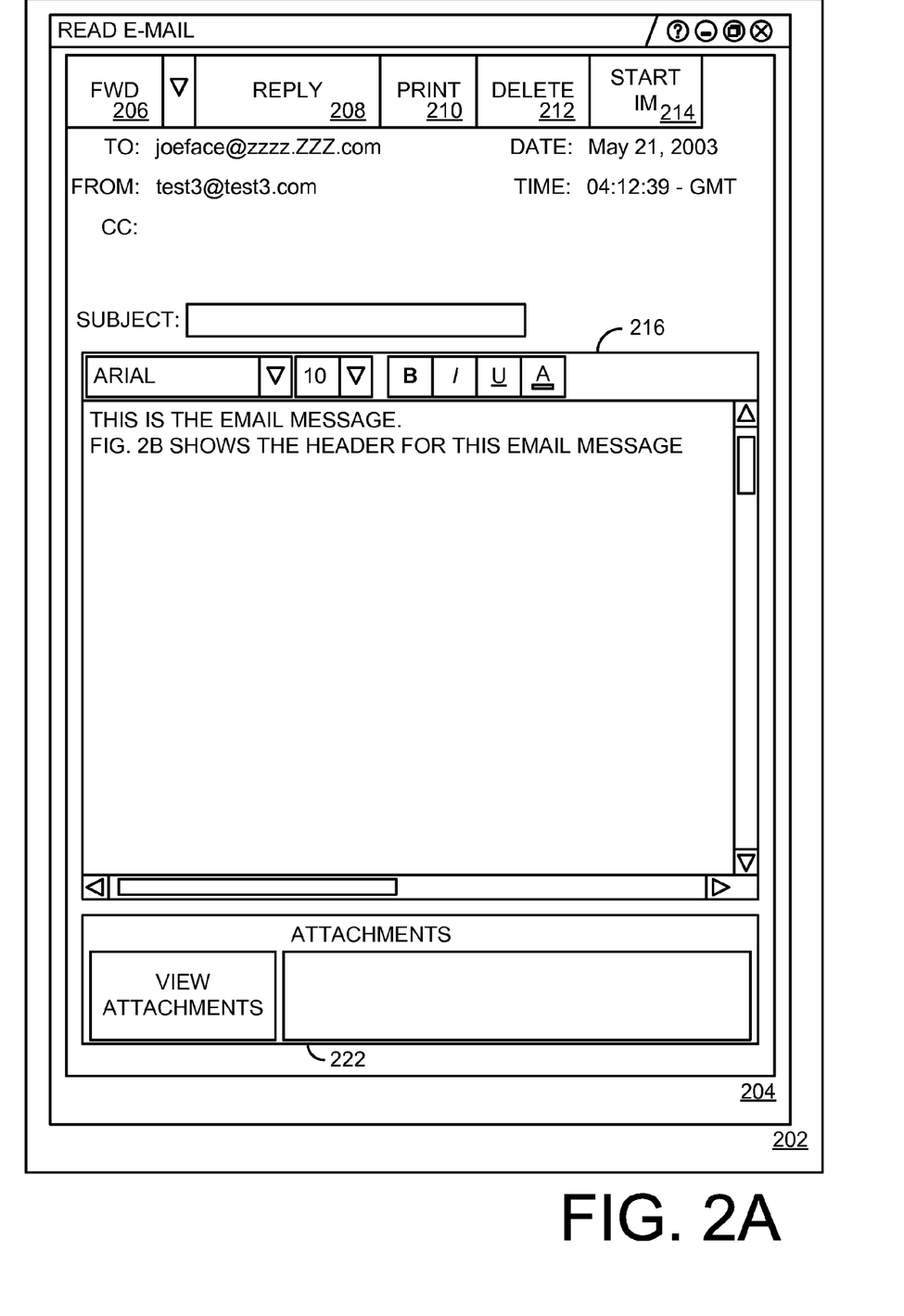
FIG. 2A is a diagram showing an embodiment of an email read window having an undesired email message.

FIG. 2A is a diagram showing an embodiment of an email read window having an undesired email message. As shown in FIG. 2A, the undesired email message originates from a domain "test3.com" that is a known source of spam from a particular country, such as, for example, Korea. The header 240 for this email message is shown in FIG. 2B. As shown in FIG. 2B, the email message of FIG. 2A originated from 211.209.246.93, which is a domain from an undesired geographic location 250, specifically a Korea domain. The email message was delivered to joeface@zzzz.ZZZ.com on Tuesday, May 20, 2003 at 15:13:43-0400 GMT. Before reaching joeface@zzzz.ZZZ.com, the email message propagated through several hops including utility3.ZZZ.com, having IP address ZZZ.ZZZ.36.202; smtp.ZZZ.com, having IP address ZZZ.ZZZ.36.186; mcafee.ZZZ.com, having IP address ZZZ.ZZZ.36.86; and mail1.ZZZ.com having IP address ZZZ.ZZZ.36.102. As shown in this example, a particular email message may propagate through several different IP addresses before reaching its final destination. In this regard, if any of the hops includes an IP address indicative of a domain from an undesired geographic location, then the email application 185 may be configured to filter and delete those email messages that have propagated through a non-U.S. hop.

In addition to the originating IP address and the various hops, the email message header 240 of FIG. 2B also contains other attributes. For example, the header 240 includes a subject line, which, in this case, is blank; a reply-to email address; a content-type; multipurpose Internet mail extension (MIME) encoding information; and various email-related dates and times. While not specifically shown in FIG. 2B, it should be appreciated that email messages may contain other attributes such as a list of attachments, type of attachments, and/or other types of known email-related attributes.

Some or all of these attributes may be used to determine whether or not the email message should be deleted. For example, in the embodiment of FIG. 2B, if the sender's email address "basic4@basic4.com" is included in the desired email attribute database 110, then, despite originating from a domain from an undesired geographic location, the email message will not be deleted because it contains at least one desired attribute. These desired attributes may be used in conjunction with other known algorithms that employ known heuristics, thereby providing greater reliability in spam and junk mail filtering.

As shown from the embodiments of FIGS. 1A through 2B, the non-U.S. IP address database 105, in conjunction with the IP address extracting filter 112 and the IP address compare logic 114, provides an efficient approach to filtering out a bulk of the junk mail or spam email messages by segregating email messages that originate from domain from undesired geographic locations.

Figure 3:
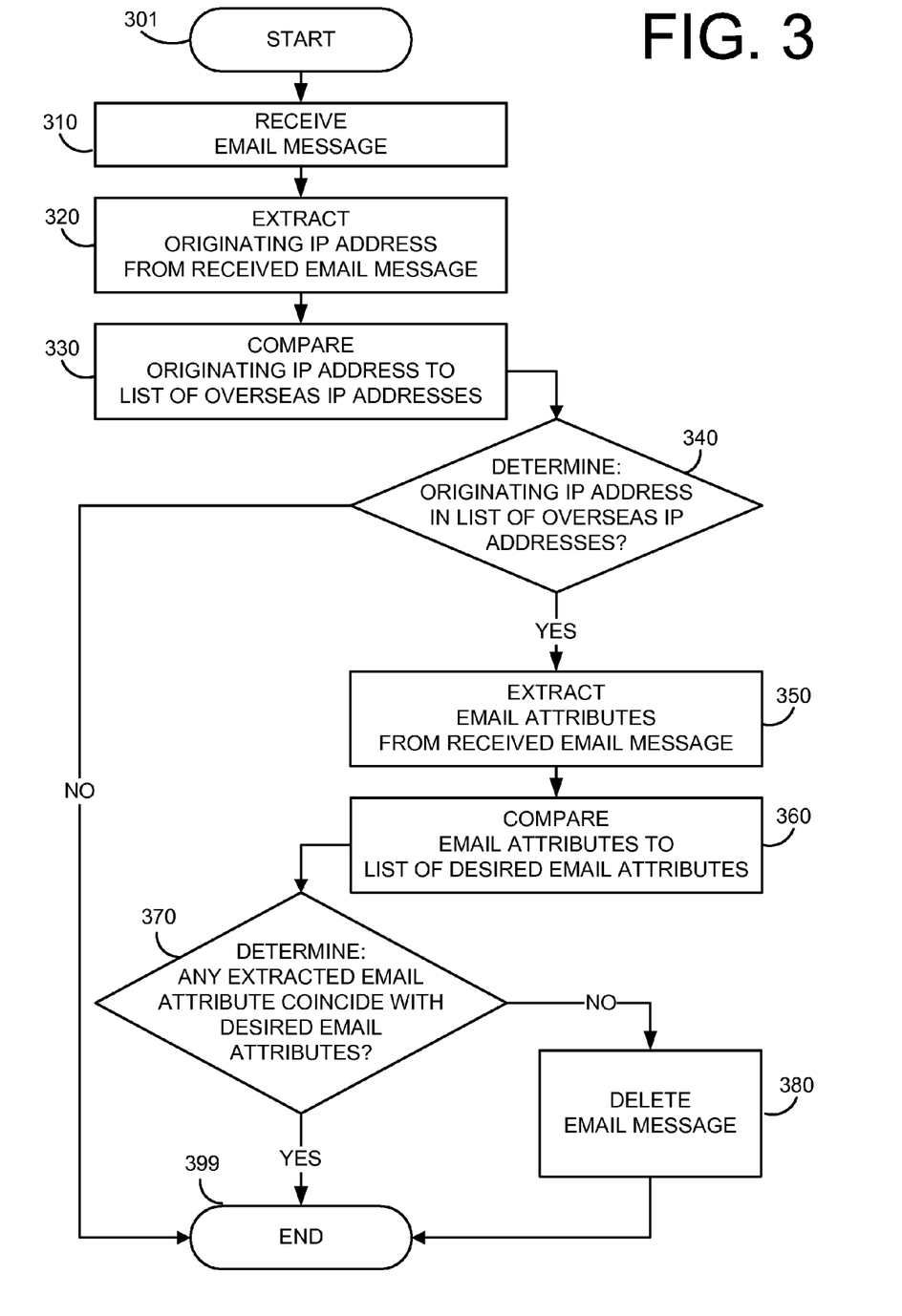
FIG. 3 is a flowchart showing an embodiment of a method for filtering email messages.

FIG. 3 is a flowchart showing an embodiment of a method for filtering email messages. As shown in FIG. 3, an embodiment of the method begins when an email message is received (310). Upon receiving (310) the email message, an originating IP address is extracted (320) from the received (310) email message. The originating IP address is then compared (330) to a list of non-U.S. IP addresses (e.g., overseas IP addresses). In some embodiments, the list of non-U.S. IP addresses are stored in a database. In other embodiments, the list of non-U.S. IP addresses may be determined by accessing known domain-name servers (DNS). In any event, in response to comparing (330) the IP addresses, the system determines (340) whether or not the originating IP address coincides with any of the non-U.S. IP addresses. If the originating IP address does not coincide with any of the non-U.S. IP addresses, then the process ends (399). If, on the other hand, the originating IP address coincides with at least one of the non-U.S. IP addresses, then email attributes are further extracted (350) from the email message. The extracted email attributes are compared (360) to a list of desired email attributes. In some embodiments, the desired email attributes may be stored in a local database. In other embodiments, the desired email attributes may be hard-coded into the email application. In any event, upon comparing (360) the attributes, the system determines (370) whether or not any of the extracted email attributes coincides with any of the desired email attributes. If any of the extracted email attributes coincides with any of the desired email attributes, then the process terminates (399). If, on the other hand, none of the extracted email attributes coincides with any of the desired email attributes, then the email message is deleted (380), and the process terminates (399). In this regard, the latter portion of the process (steps 350 through 370) provide an exception-based approach that prevents deletion of desired email messages, despite their origin from an undesired geographic region.

While specific embodiments of the process are shown in FIG. 3, it should be appreciated that other algorithms may be employed to determine exceptions that prevent deletion of desired email messages. As is known in the art, these exceptions may be rule-based or may be based on algorithms employing complex heuristics. Since these rule-based approaches for determining exceptions are known in the art, no further discussion of these approaches is included herein.

As shown in the embodiment of FIG. 3, a process that filters email messages to determine whether or not the email message originates from a domain from an undesired geographic location provides an efficient approach to filtering out junk mail or spam email messages that originate from domains located in undesired geographic locations. Since much of the junk mail or spam originates from domain from undesired geographic locations, the filtering of email messages for non-U.S. IP addresses results in a simple and efficient approach to reducing clutter in email accounts.

The email application, the IP address extracting filter, the IP address compare logic, the attribute extracting filter, the attribute compare logic, the email delete logic, the mail store, the undesired IP address database, and the desired email attribute database of the present invention can be implemented in hardware, software, firmware, or a combination thereof. In the preferred embodiment(s), the email application, the IP address extracting filter, the IP address compare logic, the attribute extracting filter, the attribute compare logic, the email delete logic, the mail store, the undesired IP address database, and the desired email attribute database are implemented in software or firmware that is stored in a memory and that is executed by a suitable instruction execution system. If implemented in hardware, as in an alternative embodiment, the email application, the IP address extracting filter, the IP address compare logic, the attribute extracting filter, the attribute compare logic, the email delete logic, the mail store, the undesired IP address database, and the desired email attribute database can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The email application, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. For example, while the determination of the originating IP address and the determination of the email attributes are shown as separate and sequential steps, it should be appreciated that these steps may occur substantially simultaneously. Alternatively, these steps may be performed in reverse order such that the attributes are compared prior to determining the originating IP address of the email message. Moreover, while certain embodiments show the email client as filtering email messages for origin from an undesired geographic regionation, the filtering process may be implemented at the server level, thereby filtering email messages prior to conveying them to the email client. All such changes, modifications, and alterations should therefore be seen as within the scope of the present invention.

What is claimed is:

1. A communication system comprising:
    a receiver configured to receive an email message, the email message originating from an originating domain, the email message comprising a header, the header including an originating Internet protocol (IP) address, the originating IP address being indicative of the originating domain;
    a first database having a non-U.S. IP address, the non-U.S. IP address being indicative of an origin from a domain originating from an undesired geographic region;
    a first filter configured to extract the originating IP address from the received email message; and
    compare logic configured to compare the extracted originating IP address with the non-U.S. IP address in the first database to determine whether the originating IP address corresponds to a domain from an undesired geographic location.

2. The system of claim 1, further comprising:
    delete logic configured to delete the email message in response to determining that the originating IP address corresponds to a domain from an undesired geographic location.

3. The system of claim 1, further comprising:
    means for deleting the email message in response to determining that the originating IP address corresponds to a domain from an undesired geographic location.

4. The system of claim 1, further comprising:
    a second database having a list of desired email attributes.

5. The system of claim 4, wherein the list of desired email attributes in the second database comprises an attribute selected from the group consisting of:
    a desired IP address;
    a sender email address;
    an email subject line; and
    a content type.

6. The system of claim 4, further comprising:
    a second filter configured to extract email attributes from the received email message;
    compare logic configured to compare the extracted attributes with the list of desired email attributes to determine whether any of the extracted attributes coincides with any of the desired email attributes in the second database; and
    delete logic configured to delete the email message in response to determining that the originating IP address corresponds to a domain from an undesired geographic location and that none of the extracted attributes coincides with any of the desired email attributes in the second database.

7. A communication method comprising:
    receiving an email message, the email message originating from an originating Internet protocol (IP) address;
    extracting the originating IP address from the email message;

extracting email attributes from the received email message;

comparing the extracted attributes with a predefined list of desired email attributes to determine whether any of the extracted email attributes coincides with any of the desired email attributes;

comparing the originating IP address to a list of non-U.S. IP addresses; and identifying the received email message as originating from an undesired geographic location, in response to determining that the originating IP address is included in the list of non-U.S. IP addresses.

8. The method of claim 7, wherein the extracting the originating IP address from the email message comprises:

extracting the originating IP address from a header of the email message.

9. The method of claim 7, wherein the extracting the originating IP address from the email message comprises:

extracting an IP address from a body of the email message.

10. The method of claim 7, further comprising:

deleting the email message in response to determining that the extracted IP address is included in the list of non-U.S. IP addresses.

11. The method of claim 10, wherein the deleting the email message comprises the step of permanently removing the email message.

12. The method of claim 10, wherein the deleting the email message comprises storing the email message in a designated folder.

13. The method of claim 10, wherein the deleting the email message comprises marking the email message for follow-up.

14. The method of claim 7, further comprising:

deleting the email message in response to determining that the originating IP address is included in the list of non-U.S. IP addresses and that none of the extracted attributes coincides with any of the desired email attributes.

15. A non-transitory computer-readable medium comprising:

computer-readable code adapted to instruct a programmable device to receive an email message, the email message originating from an originating Internet protocol (IP) address;

computer-readable code adapted to instruct a programmable device to extract the originating IP address from the email message;

computer-readable code adapted to instruct a programmable device to extract email attributes from the received email message;

computer-readable code adapted to instruct a programmable device to compare the extracted attributes with a predefined list of desired email attributes to determine whether any of the extracted email attributes coincides with any of the desired email attributes; and computer-readable code adapted to instruct a programmable device to compare the originating IP address to a list of non-U.S. IP addresses to determine whether the extracted email address corresponds to a domain from an undesired geographic location.

16. The computer-readable medium of claim 15, further comprising:

computer-readable code adapted to instruct a programmable device to delete the email message in response to determining that the originating IP address is included in the list of non-U.S. IP addresses and that none of the extracted attributes coincides with any of the desired email attributes.

\* \* \* \* \*